United States Patent
Kober et al.

(10) Patent No.: US 11,453,321 B2
(45) Date of Patent: Sep. 27, 2022

(54) ACTUATOR FOR A MOTOR-VEHICLE ACCESSORY AND ACCESSORY WITH AN ACTUATOR

(71) Applicants: Steve Kober, Treuen (DE); Robin Koerner, Muelsen (DE); Mario Backmann-Kluetsch, Altenburg (DE)

(72) Inventors: Steve Kober, Treuen (DE); Robin Koerner, Muelsen (DE); Mario Backmann-Kluetsch, Altenburg (DE)

(73) Assignee: GRAMMER AG, Ursensollen (DE)

( * ) Notice: Subject to any disclaimer, the term of this patent is extended or adjusted under 35 U.S.C. 154(b) by 15 days.

(21) Appl. No.: 16/945,025

(22) Filed: Jul. 31, 2020

(65) Prior Publication Data

US 2021/0061151 A1  Mar. 4, 2021

(30) Foreign Application Priority Data

Sep. 2, 2019 (DE) .......................... 102019006162.4

(51) Int. Cl.
*B60N 2/829* (2018.01)
*B60N 2/832* (2018.01)
*B60N 2/75* (2018.01)

(52) U.S. Cl.
CPC ............. *B60N 2/829* (2018.02); *B60N 2/763* (2018.02); *B60N 2/832* (2018.02)

(58) Field of Classification Search
CPC ......... B60N 2/829; B60N 2/832; B60N 2/763
See application file for complete search history.

(56) References Cited

U.S. PATENT DOCUMENTS

| 4,822,102 A | * | 4/1989 | Duvenkamp | ................. 297/403 |
| 5,346,282 A | * | 9/1994 | De Filippo | ............ B60N 2/874 |
| | | | | 297/395 |
| 10,493,888 B2 | | 12/2019 | Hoffmann | |
| 11,117,504 B2 | * | 9/2021 | Soy | ........................ B60N 2/874 |
| 2014/0203615 A1 | | 7/2014 | Little | |

FOREIGN PATENT DOCUMENTS

DE   202005007516 A   10/2005
DE   202009016091 U    4/2010

* cited by examiner

*Primary Examiner* — Anthony D Barfield
(74) *Attorney, Agent, or Firm* — Andrew Wilford

(57) ABSTRACT

The invention relates inter alia to an actuator (15) for operating an accessory in the vehicle passenger compartment, having an actuating element movable relative to a housing between an unactuated position and an actuated position in opposite adjustment directions (y, $y_1$) and is urged by a resetting device into the unactuated position, wherein it is possible for the actuating element to displace an element of the accessory that cooperates with the actuating element. The special feature is that the resetting device comprises at least one spring (18) configured as a spiral spring and having an outer end (25) and an inner end (26).

10 Claims, 4 Drawing Sheets

ACTUATOR FOR A MOTOR-VEHICLE ACCESSORY AND ACCESSORY WITH AN ACTUATOR

FIELD OF THE INVENTION

The invention relates in accordance with a first aspect to an actuator for an accessory of a vehicle. The vehicle is understood in terms of the invention to be a land-borne, air-borne or water-borne vehicle.

BACKGROUND OF THE INVENTION

Such an actuator is known from prior public use. The accessory, for example a headrest or an armrest of a vehicle seat, comprises an adjuster adjustable between a first position and a second position to adjust, switch or control specified vehicle functions. The adjuster is adjusted by an actuator that comprises an actuating element displaceable between an unactuated position and an actuated position.

In the prior art, the actuating element is urged into the unactuated position by a resetting device in the form of a spiral metal spring configured in a coaxial manner with respect to a central axis of the adjustment directions.

OBJECT OF THE INVENTION

It was the object of the invention to provide an actuator that can be produced in an advantageous manner, requires a small amount of installation space and is light in weight.

SUMMARY OF THE INVENTION

The actuator according to the invention has an actuating element movable relative to a frame between an unactuated position and an actuated position. The actuating element is for example a button. The actuating element is suitable for being directly or indirectly brought in connection with an adjuster of an accessory of a vehicle interior compartment with the result that the actuator can switch or control or adjust a function of the accessory if the actuator is moved between the unactuated position and the actuated position. For example, at least one part of the adjuster can be moved. The actuating element moves for example in a straight line in the axial direction between the unactuated position and the actuated position. The actuating element can be moved for example in the axial direction along the central axis of the actuator. It is possible to interpose parts between the actuating element and the accessory that are motion-connected with the actuating element but perform a different movement and/or a movement in other directions.

The actuator comprises a resetting device having at least one spring so as to return the actuator into the unactuated position. In other words, the actuating element moves back for example automatically into the unactuated position when released.

At least one spring of the resetting device is configured as a spiral spring and is wound in a spiral around a central axis. The central axis extends for example parallel to the adjustment directions of the actuating element. The spring comprises an outer end arranged remote from the central axis, and an inner end closer than the first end to the central axis. Deflection of the spring takes place via a relative movement of the inner end relative to the outer end in the adjustment direction parallel to the central axis of the spring. The spring extends for example in a plane essentially at a right angle to the central axis.

The actuator has the advantage that it can be produced as a plastic injection-molded part. The device is light in weight and requires a small amount of installation space. The actuator can be produced as one part or as an assembly using few parts.

In accordance with one embodiment of the invention, the actuating element is connected to the inner end or to the outer end and the other end is connected to the accessory, for example to a housing of the accessory. For example, the actuating element is connected to the inner end and the outer end is held directly or indirectly against the accessory. In accordance with one alternative, the actuating element is connected to the outer end and the inner end is held against the accessory. One end is consequently held fixedly against the accessory and the other end can be deflected relative to this one end by the actuating element. The deflected end of the spring or a region of the actuating element is connectable to at least one part of the accessory in such a manner that this is moved between a first position and a second position if the actuator is moved between the unactuated position and the actuated position.

For example, the actuator has a frame attached to the accessory, wherein the actuating element is movable relative to the frame during movement between the unactuated position and the actuated position. In this manner, it is possible for the actuator to be completely preassembled and brought to the accessory as an assembly and can be connected to at least one other part of the accessory.

The frame has for example a first guide and the actuating element has a second guide that cooperate during movement of the actuating element between the unactuated position and the actuated position to guide movement of the actuating element. One of the guides is formed for example by grooves and the other guide is formed by protrusions that slide in the grooves and in so doing guide the actuating element against the frame between the unactuated position and the actuated position. The actuating element is thus guided and not tilted during movement.

The outer end of the spiral spring forms for example a ring that can be attached to the frame. It is advantageous if the ring has the same cross-sectional shape with respect to the central axis as the frame. For example, the frame and the outer end are complementary to one another in the cross-section in a circular annular manner or form a rectangular ring. The spring can then be mounted in an interior space of the frame. Alternatively, however, the end can also comprise a different cross-sectional shape.

The frame has for example an attachment formation that can be brought into engagement with complementary attachment formations of the ring of the spiral spring. One of the attachment formations can be configured for example by protrusions and the other attachment formation can be configured by recesses. The protrusions are for example provided with assembly inclines that facilitate an elastic deformation of the protrusions that are arranged with oversize with respect to the frame on the outer spring end with the result that said protrusions latch into the recesses if the positions of the protrusions and those of the recesses align with one another.

The actuating element is connected to the first end or to the second end of the spring if not directly then indirectly by a coupling. It is possible in this manner to overcome a distance between the location of the spring and the location of the actuating element in the unactuated position and to create a movement connection. The coupling can be formed for example in the simplest case by a connecting piece. The connecting piece can be for example configured in a U-shaped manner that provides it with a high degree of stability.

The frame is configured for example in a sleeve-shaped manner. It can be configured for example in a somewhat cylindrical manner, for example in a circular cylindrical manner. It can comprise for example a wall formed as an outer peripheral surface and it can comprise openings on opposite-lying outlet sites of a longitudinal central axis of the sleeve. It is possible by one of the openings to actuate the actuating element and by the other opening to actuate the adjuster of the accessory.

The frame is configured for example in an essentially closed manner on the periphery. If the frame is configured for example in a sleeve-like manner, it is possible for example to shape the peripheral surface in an essentially closed manner. In this manner, contaminants are prevented from impairing the function of the actuator.

The frame forms for example a contact surface that cooperates with a contact surface of the actuating element to limit movement of the actuating element in one adjustment direction. If one spring end is attached to the frame, the contact surface of the attachment element can be urged for example by the other spring end against the stop surface. This can for example also prevent noises developing as a result of vibration or as a result of the actuating element rattling.

The stop surface and the contact surface are configured for example in an oblique manner, in particular at a 45° angle, to center the button on the frame. Since the actuating element may be mounted in the frame with a degree of play, it could be possible when the actuating element is in the unactuated position for different positions or a relative movement between the actuating element and the frame to occur in the radial direction with respect to the central axis. In the unactuated position, the actuating element is centered on the frame by the assembly inclines, i.e. said actuating element has a defined position. This prevents the development of noises and provides the user with an impression of a high-value comfort factor.

The spiral spring is prestressed for example in the unactuated position. This embodiment ensures that it is not possible in the unactuated position for a relative movement to occur between the actuating element and the frame in a direction parallel to the central axis. Due to the spring being prestressed, the contact surface of the spring is pushed with the prestressing force against the stop surface. Rattle noises are prevented in this manner.

The actuating element is for example formed as one piece with the spiral spring. The actuating element, the spiral spring and where appropriate the coupling can be produced and assembled in a simple manner if they are formed as one piece. For example, the actuating element, the spiral spring and where appropriate the coupling are formed from a synthetic material in the injection molding method. Consequently, a simple production process and a lightweight product are ensured.

The actuator is produced for example from a synthetic material. The frame and the spiral spring, the actuating element and where appropriate the coupling can be produced from a synthetic material with the advantage of a simple production process and a lightweight product.

In accordance with a second aspect, the invention relates to an accessory of a vehicle.

Such an accessory can be for example a headrest or an armrest.

A headrest is known for example from DE 10 2015 011 477 [U.S. Pat. No. 10,193,888] in the name of the applicant.

It was the object of the invention to provide an accessory having an actuator for operating an adjuster of the accessory, wherein the actuator can be produced in an advantageous manner and requires a small amount of installation space within the headrest and is also light in weight.

The accessory comprises an adjuster that comprises at least one movable part. The adjuster can be switched between a first position and a second position. The accessory comprises moreover an actuator for operating the adjuster. During a movement of the actuator from the unactuated position into the actuated position, the adjuster is switched from the first position into the second position. The adjuster is moved into the second position by virtue of the motion connection between the actuator and the adjuster.

During a movement of the actuator from the actuated position into the unactuated position, the adjuster is moved for example from the second position into the first position. This movement of the adjuster into the first position can be performed by virtue of a movement connection between the actuator and the adjuster or by a separate resetting element of the adjuster, said resetting device having been urged during movement into the second position.

The actuator is configured in accordance with the first aspect of the invention. To avoid repetitions, a description of the characteristics and advantages of the actuator is not repeated here.

For example, the accessory can be a headrest for vehicle seats. The headrest is provided as a counter bearing for the head of the vehicle occupant.

The headrest comprises a head-contact part that can be mounted on the vehicle seat by a retaining device of the headrest. The retaining device can comprise for example two individual support bars or a support bar bracket. Alternatively, the retaining device can also be configured for example differently. In the case of an integral seat, for example the head-contact part is not vertically adjustable relative to the vehicle seat. The retaining device for such a headrest can be configured differently.

The head-contact part is for example adjustable relative to the vehicle seat, in particular relative to the backrest of the vehicle seat, in a vertical and/or horizontal direction and/or with respect to its inclination. For this purpose, the adjuster comprises guides that ensure adjustability.

The headrest comprises an adjuster adjustable between a first position and a second position. The adjuster can for example cooperate with a latch or it can be part of this latch. The latch is movable between a locking position and a releasing position. Using an actuator that comprises an actuating element, the latch can be moved by the user from outside on the headrest between the locking position and the releasing position. When the actuator is in an unactuated position, the latch is located in the locking position and when the actuator is in an actuated position, the latch is located in the releasing position.

The latch is configured for example so as to lock the vertical position and/or the horizontal position and/or the inclined position of the head-contact part. The actuating element is urged by a spring into the unactuated position. The latch comprises first locking means that are allocated to the head-contact part, and second locking means that are allocated to the retaining device or to a base part of the headrest, wherein the head-contact part is movable relative to said headrest. In the latter case, the base part of the headrest is mounted on the retaining device and the head-contact part is mounted on the base part.

The actuator of the headrest is configured for example in the case of this embodiment of the accessory in accordance with the first aspect of the invention.

Further advantages result from the following description of an exemplary embodiment illustrated in the schematic drawings and described in the following description of the figures and also with reference to the schematic drawings. In so doing, for the sake of clarity—also insofar as different exemplary embodiments are concerned—like or comparable parts or elements or regions are identified by like reference numerals, in part with the addition of small letters.

Features that are only described, illustrated or disclosed with regard to one exemplary embodiment can also be provided within the scope of the invention in the case of any other exemplary embodiment of the invention. Exemplary embodiments that have been modified in such a manner are also covered by the invention—even if they are not illustrated in the drawings.

All disclosed features are essential aspects of the invention. With regard to the content, also included hereby in the disclosure of the application is the entire scope of the disclosure content of the cited publications and the described devices of the prior art, also for this purpose individual or multiple features of the subject matters disclosed therein are to be incorporated in one or multiple claims of the present application. Also such modified exemplary embodiments are covered by the invention—even if they are not illustrated in the drawings.

SPECIFIC DESCRIPTION OF THE INVENTION

Figure 1:
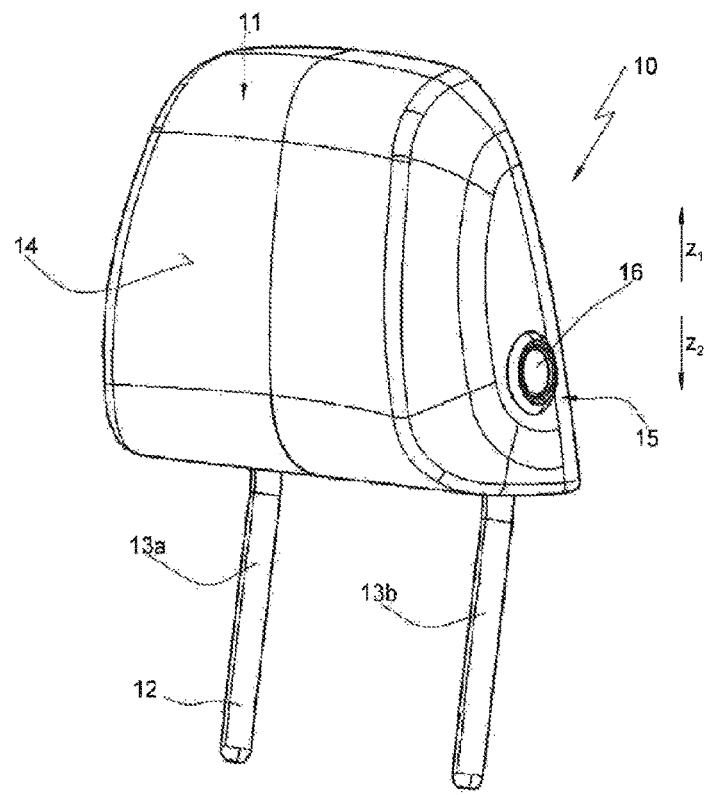
FIG. 1 is a perspective view of an accessory in the form of a headrest having a latch for locking the adjusted vertical position, wherein in terms of the invention the latch is an adjuster.

An entire headrest is denoted in the figures by the reference numeral 10. The headrest is an accessory in terms of the invention.

Figure 2:
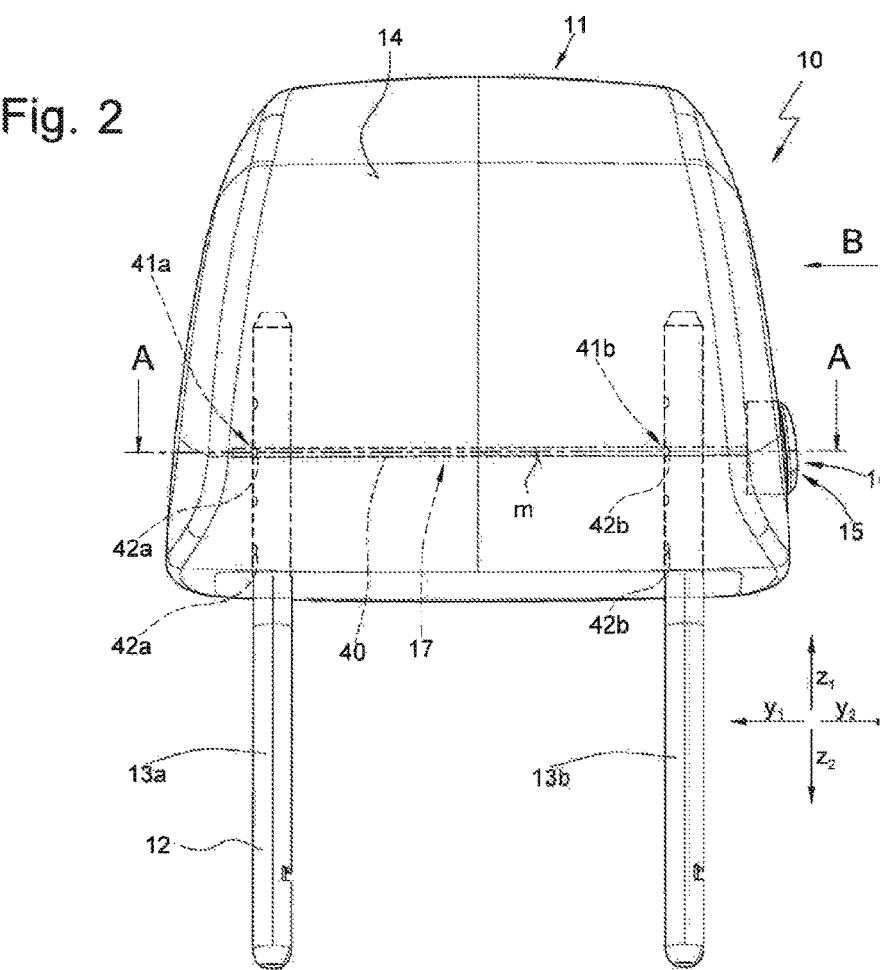
FIG. 2 is a front view of the headrest.

The headrest 10 comprises in accordance with FIGS. 1 and 2 a head-contact part 11 and a retaining device 12. The head-contact part 11 can be mounted by the retaining device 12 in a known manner on a vehicle seat not illustrated in the figure. Said head-contact part 11 acts as a counter bearing for the head of the vehicle occupant and can transmit to the vehicle seat forces that are acting on a head-contact surface 14. The direction that faces forward with regard to an occupant, whose head is to be supported by the headrest 10, is denoted by $x_1$ and the opposite direction facing rearward is denoted by $x_2$.

The retaining device comprises support bars 13a and 13b that are mounted in receptacles of the vehicle seat. The head-contact part 11 is mounted on the support bars 13a and 13b in such a manner so as to be adjustable relative to the support bars 13a and 13b in the directions $z_1$ and $z_2$. To lock the head-contact part 11 in the adjusted height position, the headrest 10 comprises a latch 17 (cf. FIG. 2). The latch 17 is an adjuster in terms of the invention. The latch 17 comprises first locking elements 41a and 41b (cf. FIG. 2) of the head-contact part 11 that work together with second locking elements 42a and 42b of the retaining device 12 to lock the head-contact part 11 in a releasable manner.

In the present exemplary embodiment, the first locking elements 41a and 41b have the shape of latching edges that are allocated to a slider 40. The latching edges are shaped in the example as one part with the slider 40. The second locking elements 42a and 42b have in the present exemplary embodiment the shape of recesses in each of the support bars 13a and 13b. If the locking element 41a is in engagement with the locking element 42a and the locking element 41b is in engagement with the locking element 42b, a vertical adjustment is locked, in other words not possible. If the locking elements 41a and 42a and also 41b and 42b are moved to disengage, a vertical adjustment is possible.

The latch 17 is movable between a locking position and a releasing position. In the locking position, the locking means are engaged and the head-contact part 11 is locked in an immovable manner in the directions $z_1$ and $z_2$ relative to the support bars 13a and 13b. In accordance with one alternative, in the locking position, despite the engagement of the locking elements the head-contact part 11 could be immovable in the direction $z_2$ and movable in the direction $z_1$. In the release position, the head-contact part 11 is movable in directions $z_1$ and $z_2$. The latch 17 is urged into the locking position by a resetting device.

It is possible by an actuator 15 that comprises a central axis m to adjust the latch 17 out of the locking position into the releasing position, in which the locking elements 41a, 41b, 42a and 42b are disengaged. The actuator 15 comprises an actuating element 16. In the unactuated position of the actuator 15, the latch 17 is located in the locking position and in the actuated position of the actuating element 16, the latch 17 is located in the releasing position. The actuator 15 comprises a spring 18 with which the actuating element 16 is urged into the unactuated position. The spring 18 is configured as a spiral spring.

In the actuated position, the actuating element 16 is displaced in the direction $y_1$ due to the actuation by a user with respect to the unactuated position and in the unactuated position the actuating element 16 is displaced in the direction $y_2$ due to the resetting force of the spring 18 with respect to the actuated position.

Figure 3:
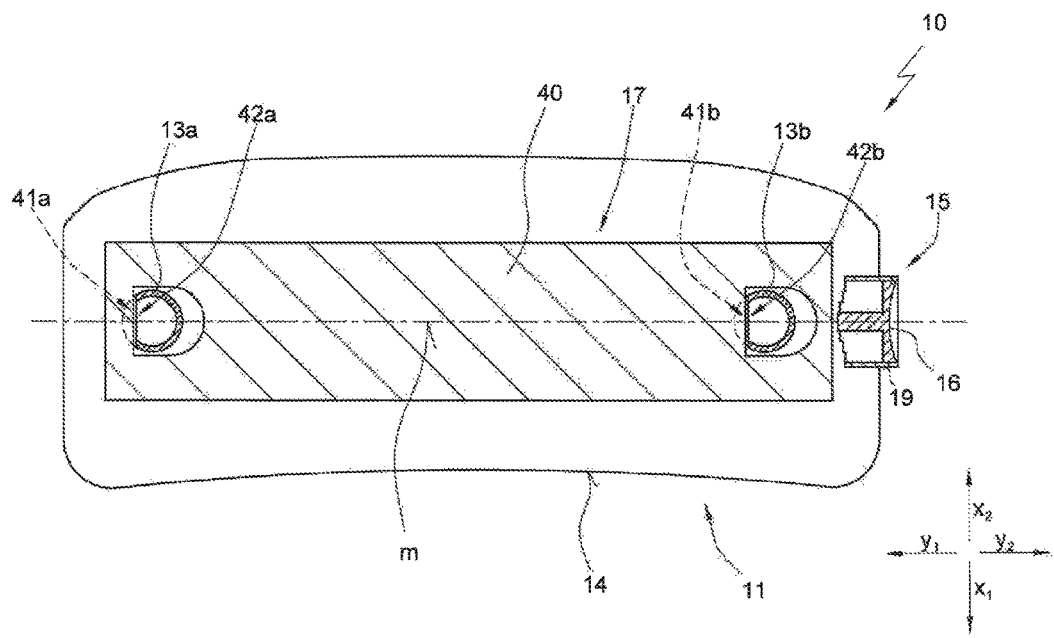
FIG. 3 is a sectional view in accordance with the section line A-A in FIG. 2.

In contrast to the illustration in FIG. 3, the slider is connected to the actuator in such a manner that during movement of the actuating element 16 from the unactuated position into the actuated position with respect to a frame 19 of the actuator 15 the head case immovable relative to the support bars 13a and 13b is held fixedly against a head case of the headrest 10, the slider 40 is likewise moved in the direction $y_1$, wherein the locking elements 41a and 42a and also 41b and 42b become disengaged. If the actuating element 16 is released, the slider 40 urged in the direction $y_2$ by a spring, not illustrated, is moved back in the direction $y_2$ into the position in accordance with FIG. 3, wherein the locking elements 41a and 42a and also 41b and 42b move into engagement. The actuating element 16 is moved by the spring 18 into the unactuated position.

Figure 4:
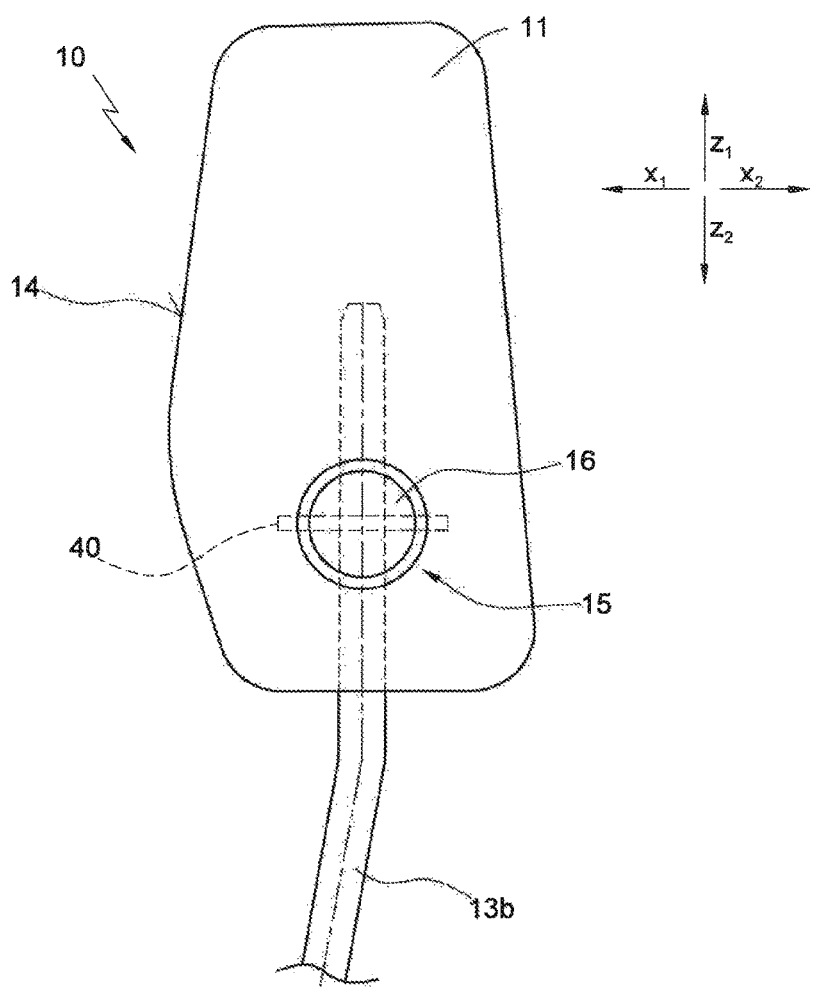
FIG. 4 is a view of the headrest in the direction of arrow B in FIG. 2.

FIG. 4 illustrates a lateral view of the headrest 10, wherein the parts that are concealed in FIG. 3 are illustrated by the broken line. The actuator 15 is illustrated as an assembly in FIGS. 5 to 9.

Figure 5:
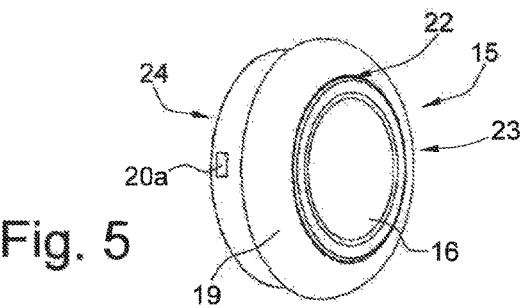
FIG. 5 is a perspective view of an actuator of the headrest for operating the latch, wherein the actuator is arranged in the unactuated position.
Figure 6:
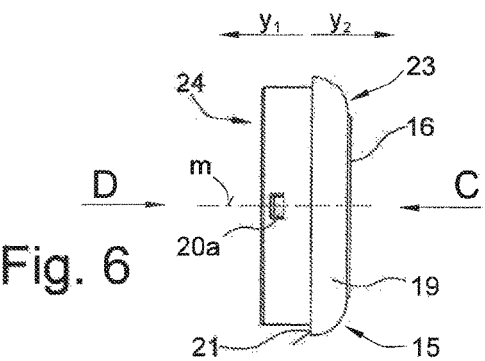
FIG. 6 is a lateral view of the actuator in accordance with FIG. 5.
Figure 7:
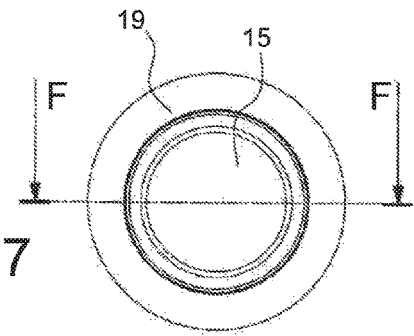
FIG. 7 is a view in the direction of arrow C in FIG. 6.
Figure 8:
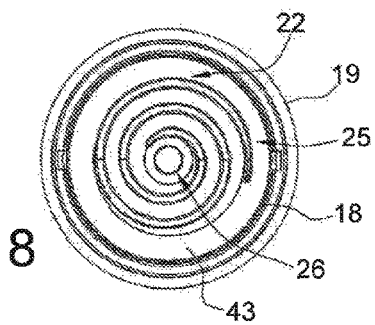
FIG. 8 is a view in the direction of arrow D in FIG. 6.

In accordance with FIG. 5, the actuator 15 comprises the frame 19 configured in the present exemplary embodiment as a sleeve essentially closed in the peripheral direction and forms a collar at one end 23 and is provided with openings with respect to the central axis m at both ends 23 and 24. The frame 19 could however also have a different shape, for example it could be formed as a framework formed of mere guidance strips. The frame could alternatively also be formed on a fixed structure of the accessory, such as for example on the head case of the headrest 10. In this case, said frame can be provided with the same features as the frame described in this exemplary embodiment.

The frame 19 is provided with opposite attachment formations 20a and 20b—in this case in the form of recesses—that are explained below. The frame 19 forms a shoulder 21 that acts as a stop for the assembly on the head-contact part 13.

The frame 19 forms an approximately circular cylindrical interior space 22 in the present exemplary embodiment. The actuating element 16 is guided movably between the unactuated position and the actuated position in the interior space 22 of the frame 19, cf. FIGS. 9a and 9b. At the end 23 of the frame 19, the actuating element 16 is arranged in an actuatable manner in the interior space 22. An actuating surface 35 of the actuating element 16 comprises a boundary region 36 radially remote from the central axis m, and a central region 37 arranged close to the central axis. The central region 37 is formed in such a manner to be set back from the boundary region 36 in the direction $y_1$. The actuating surface 35 transitions smoothly from the boundary region 36 into the central region 37 with the result that a recess is formed advantageous for haptic reasons.

The spring 18 is arranged at an end 24 of the interior space 22, said end lying opposite the end 23. As is apparent in FIG. 7, the actuating element 16 and the spring 18 are configured in a coaxial manner with respect to the central axis m.

The spring 18 extends in a spiral manner essentially within one plane E1 that runs approximately at a right angle to the central axis m. In accordance with FIG. 8, the spring comprises an outer end 25 and also an inner end 26. The outer end 25 is attached to the frame 19 with the result that it is neither rotatable about the central axis nor movable in the direction $y_1$ and $y_2$.

In accordance with FIG. 9, the inner end 26 is connected to the actuating element 16 by a coupling 27 in the form of a connecting piece that has a U-shaped cross section with respect to the central axis. As is apparent in FIG. 7, the frame 19 comprises at least one stop surface 28 inclined approximately at 45° with respect to the central axis m and cooperates with the at least one complementarily formed contact surface 29 in such a manner that it forms a stop for the actuating element 16 and centers said actuating element in the unactuated position.

Figure 9A:
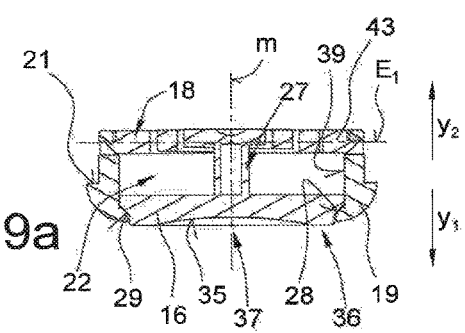
FIG. 9a is a sectional view in accordance with the section line F-F in FIG. 7, FIG. 9b following on from FIG. 9a illustrates the actuator in the actuated position, FIG. 10 a perspective view of a frame of the actuator as an individual part.
Figure 9B:
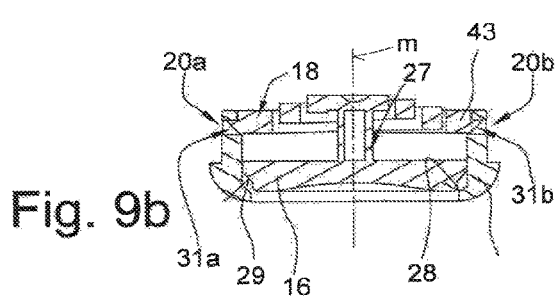
Figure 10:
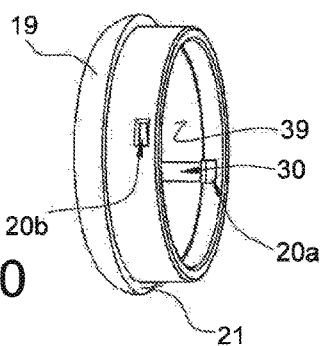
Figure 11:
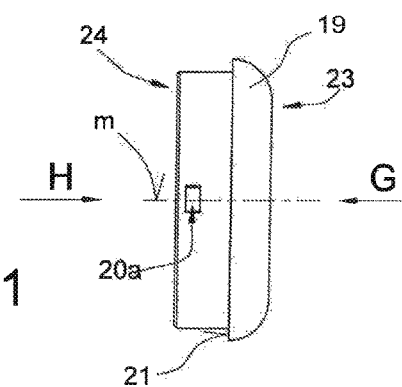
FIG. 11 is a lateral view of the frame in accordance with FIG. 10.
Figure 12:
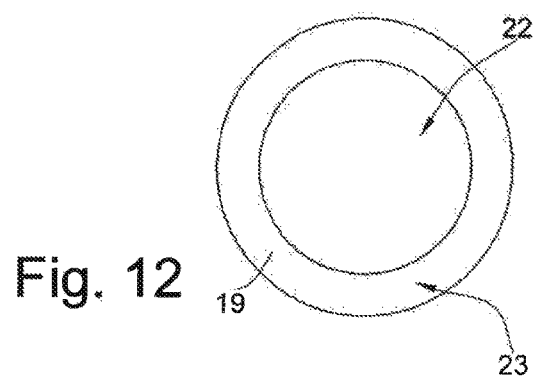
FIG. 12 is a view in the direction of arrow G in FIG. 11.
Figure 13:
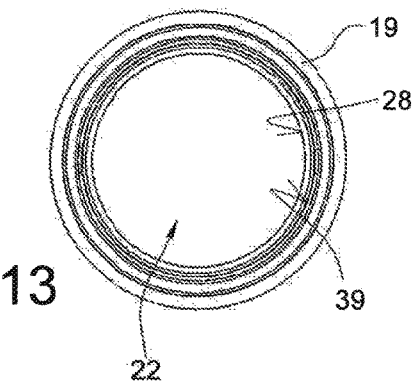
FIG. 13 is a view in the direction of arrow H in FIG. 11.
Figure 14:
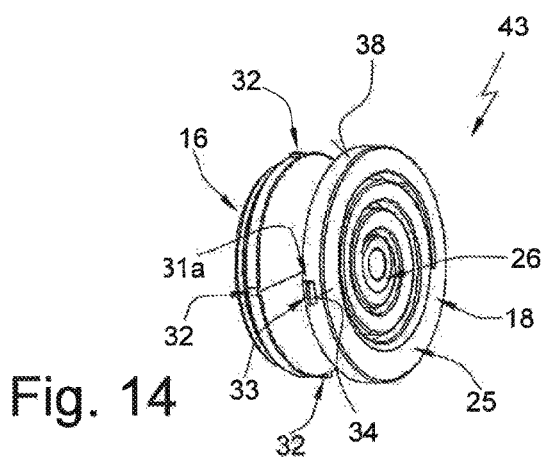
FIG. 14 is a perspective view of an actuating unit comprising an actuating element, a coupling and a spring of the actuator.
Figure 15:
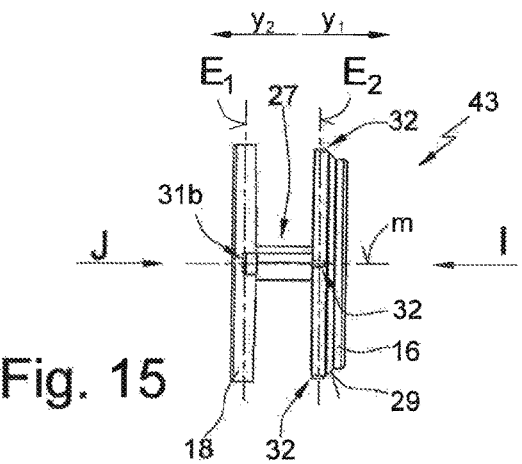
FIG. 15 is a lateral view of the actuating unit in accordance with FIG. 14.
Figure 16:
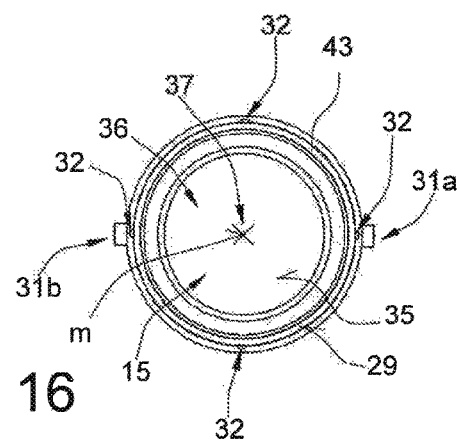
FIG. 16 is a view in the direction of arrow I in FIG. 15.
Figure 17:
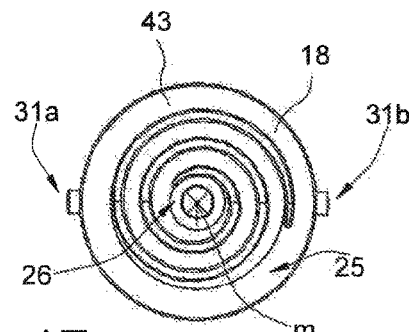
FIG. 17 is a view in the direction of arrow J in FIG. 15.

FIG. 9a illustrates the unactuated position of the actuator 15 and FIG. 9b illustrates the actuated position.

In accordance with FIGS. 10 to 13, the frame 19 is illustrated as an individual part. It comprises the diametrically opposite-lying attachment formations 20a and 20b and also four first guides 30 that extend parallel to the central axis and are distributed over the inner periphery of an upper surface 39 of the interior space 22, these guides 30 being grooves that lie diametrically opposite with respect to the central axis m (only one shown in FIG. 10).

FIGS. 14 to 17 illustrate the actuating unit comprising an actuating element 16, a coupling 27 and a spring 18. The annular outer end 25 comprises a radially facing flank area 38, protruding from which are the attachment formations 31a and 31b—each in the form of a protrusion—that lie diametrically opposite each other with respect to the central axis m. Each protrusion comprises an inclined surface 33 configured in an oblique manner with respect to the central axis, and a retaining surface 34 extending generally perpendicular with respect to the central axis m.

The actuating element 16 lies in a plane E2 and has four second guides 32 that project radially outward from and are angularly spaced around the central axis m are distributed over the periphery and that slide axially in the guides 30 during movement between the unactuated position and the actuated position to guide the actuating element 16.

The coupling 27 extends in the directions $y_1$ and $y_2$ between the actuating element 16 and the spring 18. The coupling 27 is configured in U-shape in a cross-section with respect to the central axis m. The spring 18 extends from the coupling approximately at a right angle with respect to the central axis m in a plane E1 and the actuating element 16 extends approximately at a right angle with respect to the central axis m in a plane E2. The plane E2 is parallel to the plane E1.

The spring 18, the coupling 27 and the actuating element 16 form the actuating element 43 produced in one piece in the synthetic material injection molding method. However, alternatively, the spring 18, the coupling 27 and the actuating element 16 can also be produced as an assembly of individual parts that are connected to one another. The actuating unit 43 is produced for example from a synthetic material, in particular a glass-fiber reinforced synthetic material. The synthetic material is for example polypropylene or polyamide or for example a polycarbonate/acrylonitrile-butadiene-styrene blend.

The invention claimed is:

1. An actuator for operating an accessory in the vehicle passenger compartment and having a movable element, comprising:
   a first guide on the accessory;
   an actuating element operatively cooperating with the movable element and, for movement of the movable element, being movable relative to the first guide between an unactuated position and an actuated position in axially opposite adjustment directions;
   a second guide on the actuating element that moves relative to the first guide on displacement of the actuating element between the positions;

a resetting device urging the actuating element into the unactuated position, the movable element of the accessory being displaceable by the actuating element with movement of the second guide along the first guide;

a spiral spring of the resetting device having an outer end formed as a ring and an inner end and centered on a central axis extending parallel to the adjustment directions within a plane extending generally perpendicular to the central axis, the first and second guides extending axially and being slidable on each other; and attachment formations securing the ring to the accessory.

2. The actuator according to claim 1, wherein the actuating element is connectable to one of the ends and the other end is connectable to the accessory.

3. The actuator according to claim 1, further comprising:
a frame attachable to the accessory and forming the first guide, the actuating element moving relative to the frame during movement between the unactuated position and the actuated position.

4. The actuator according to claim 1, further comprising:
a coupling connecting the actuating element to one of the ends of the spring.

5. The actuator according to claim 1, wherein the spring is prestressed into the unactuated position to bias the actuating element opposite the actuation direction.

6. An actuator for operating an accessory in the vehicle passenger compartment and having a movable element, comprising:
a first guide on the accessory;
an actuating element operatively cooperating with the movable element and, for movement of the movable element, being movable relative to the first guide between an unactuated position and an actuated position in axially opposite adjustment directions;
a second guide on the actuating element that moves relative to the first guide on displacement of the actuating element between the positions;
a resetting device urging the actuating element into the unactuated position, the movable element of the accessory being displaceable by the actuating element with movement of the second guide along the first guide;
a spiral spring of the resetting device having an outer end formed as a ring and an inner end;
attachment formations securing the ring to the accessory; and
a frame attachable to the accessory and forming the first guide, the actuating element moving relative to the frame during movement between the unactuated position and the actuated position, the frame forming a stop surface that cooperates with a contact surface of the actuating element to limit movement of the actuating element in one of the adjustment directions, the stop surface and the contact surface extending at an acute angle to each other to center the actuating element on the frame.

7. A vehicle accessory having an adjusting unit movable by an actuator according to claim 1 between at least a first position and a second position.

8. The vehicle accessory according to claim 7, wherein the vehicle accessory is a headrest or an armrest of a vehicle seat.

9. An actuator for operating an accessory in the vehicle passenger compartment and having a movable element, comprising:
a first guide on the accessory;
an actuating element operatively cooperating with the movable element and, for movement of the movable element, being movable relative to the first guide between an unactuated position and an actuated position in axially opposite adjustment directions;
a second guide on the actuating element that moves relative to the first guide on displacement of the actuating element between the positions, one of the guides being an axially extending groove and the other of the guides being a radial projection engaged in the groove;
a resetting device urging the actuating element into the unactuated position, the movable element of the accessory being displaceable by the actuating element with movement of the second guide along the first guide;
a spiral spring of the resetting device having an outer end formed as a ring and an inner end; and
attachment formations securing the ring to the accessory.

10. The vehicle accessory according to claim 9, wherein the groove is in the accessory and the ridge is on the actuating element.

* * * * *